(12) United States Patent
Takeshi

(10) Patent No.: US 8,292,425 B2
(45) Date of Patent: Oct. 23, 2012

(54) EYEGLASSES

(75) Inventor: Katsuya Takeshi, Higashiosaka (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 578 days.

(21) Appl. No.: 12/548,669

(22) Filed: Aug. 27, 2009

(65) Prior Publication Data

US 2010/0053545 A1 Mar. 4, 2010

(30) Foreign Application Priority Data

Aug. 27, 2008 (JP) ................................ 2008-218780

(51) Int. Cl.
*G02C 1/02* (2006.01)
(52) U.S. Cl. ........................................ 351/110; 351/153
(58) Field of Classification Search .................. 351/110, 351/153, 118, 106, 103
See application file for complete search history.

(56) References Cited

U.S. PATENT DOCUMENTS

| | | | |
|---|---|---|---|
| 4,824,233 A | | 4/1989 | Jannard |
| 4,978,209 A | * | 12/1990 | Ohba ............................ 351/153 |
| 4,998,815 A | | 3/1991 | Lin |
| 5,387,949 A | | 2/1995 | Tackles |
| 5,592,242 A | | 1/1997 | Ooie |
| 5,661,536 A | | 8/1997 | Conway |
| 2006/0017879 A1 | | 1/2006 | Baek |

FOREIGN PATENT DOCUMENTS

| | | |
|---|---|---|
| CN | 1725061 A | 1/2006 |
| EP | 1 361 471 A1 | 11/2003 |
| FR | 954 467 | 1/1950 |
| JP | 06-175085 | 6/1994 |
| JP | 3014209 | 5/1995 |
| TW | 341335 | 10/1996 |
| TW | 333341 | 6/1998 |
| TW | 335908 | 7/1998 |
| TW | 347876 | 12/1998 |
| TW | 348859 | 12/1998 |
| WO | 2005 091053 | 9/2005 |

OTHER PUBLICATIONS

European Search Report dated Dec. 16, 2009 for corresponding European application EP 09168691.5-2217.
Office Action from corresponding Chinese Patent Application 200910168362.0, dated Feb. 13, 2012, 8 pages.

* cited by examiner

*Primary Examiner* — Hung Dang
(74) *Attorney, Agent, or Firm* — Heslin Rothenberg Farley & Mesiti P.C.

(57) ABSTRACT

A pair of eyeglasses includes a lens, a couple of right and left elastically deformable frames attached to respective side end portions of the lens, and a couple of right and left temples attached to the respective frames. A frame fitting portion is provided at each of the side end portions of the lens and a lens fitting hole is provided in a front portion of each of the frames. The frame fitting portion fits into the lens fitting hole so that the lens is detachably attached to each of the frames. The volume of the frames is reduced to lighten the weight of the eyeglasses as a whole. With the eyeglasses, a forward vision of a wearer is guaranteed when he leans forward, and easy lens exchange is achieved.

10 Claims, 14 Drawing Sheets ically provided with a twelfth fitting portion to mate with the eleventh fitting portion. The eleventh and twelfth fitting portions are fittable to each other.

EYEGLASSES

CROSS REFERENCE TO RELATED APPLICATIONS

This application claims priority of Japanese Application No. 2008-218780 filed on Aug. 27, 2008, the entire contents of which is hereby incorporated herein by reference.

BACKGROUND OF THE INVENTION

1. Field of the Invention

The present invention relates to eyeglasses in which a lens is exchangeable.

2. Description of the Related Art

A conventional example of this type of eyeglasses is shown in FIGS. 11 and 12, which is disclosed in U.S. Pat. No. 4,824,233. This example is designed as a pair of sunglasses and includes a transparent curved plate-shaped lens 21, a frame 22 having the length covering the entire upper edge of the lens 21 and fittingly receiving the lens 21 therein, and temples 23 foldably attached to respective left and right ends of the frame 22.

However, since the pair of eyeglasses described above includes the frame 22 having the length covering the entire upper edge of the lens 21, this frame 22 disadvantageously increases the volume and weight of the eyeglasses. Further, the frame 22 narrows the forward vision of a wearer of the eyeglasses. In particular, in case the wearer leans forward, for example, in riding on a bicycle, the wearer has difficulty looking forward.

Another example of this type of eyeglasses is shown in FIGS. 13 and 14, which is disclosed in the Japanese Patent Application, Publication No. H06-175085 A1. This example is designed as a pair of sunglasses, and includes a flexible, elastic single lens 31 having an appropriate curved surface, a couple of left and right frames 32 respectively fixed to the upper edges of the respective side end portions of the lens 31, and temples 33 attached to the respective frames 32. The upper edge portions of the respective side end portions of the lens 31 have threaded holes (not shown) for screws, and the frames 32 are detachably fixed to the lens 31 with screws 34.

In the eyeglasses described above, the structure in which the frames 32 are detachably fixed to the upper edges of the respective side end portions of the lens 31 with the screws 34 provides sufficient fixing strength but requires time and labor in assembling. In practice, although a lens is detachably fixed, it is not easily detached and attached, and exchanging lenses is troublesome.

SUMMARY OF THE INVENTION

It is hence an object of the present invention to solve the foregoing conventional problems, and to provide eyeglasses in which the volume of a frame member is reduced to lighten the eyeglasses, an effective forward vision of a wearer is guaranteed even when he or she leans forward, and a lens is readily detached from and attached to the frame member so as to enable a very easy lens exchange.

For the purposes, eyeglasses according to the present invention include a lens, a couple of right and left elastically deformable frames attached to respective side end portions of the lens, and a couple of right and left temples attached to the respective frames. A frame fitting portion is provided at each of the side end portions of the lens, and a lens fitting hole is provided in a front portion of each of the frames. The frame fitting portion fits into the lens fitting hole so that the lens is detachably attached to each of the frames.

In the eyeglasses according to the present invention, furthermore, a first fitting portion is provided at an upper portion of the frame fitting portion, a second fitting portion is provided at a lower portion of the frame fitting portion, a third fitting portion is provided on an upper face of the lens fitting hole, and a fourth fitting portion is provided on a lower face of the lens fitting hole. The first and third fitting portions are fittable to each other and the second and fourth fitting portions are fittable to each other.

In the eyeglasses according to the present invention, the lens fitting hole is formed and defined by an upper wall, a lower wall, an inner wall and an outer wall.

In the eyeglasses according to the present invention, a cutout laterally crossing a center portion of at least one of the inner wall and the outer wall is provided to separate at least one of the inner and outer walls into upper and lower portions.

Further, in the eyeglasses according to the present invention, a rear portion of each of the frames has a first female temple fitting portion at its upper end and a second female temple fitting portion at its lower end, and a front portion of each of the temples has first and second male frame fitting portions. The first male frame fitting portion can be fitted into and detached from the first female temple fitting portion and the second male frame fitting portion can be fitted into and detached from the second female temple fitting portion, and each of the temples is detachably attached to each of the frames.

Also, in the eyeglasses according to the present invention, a fifth fitting portion is provided on the first female temple fitting portion, a sixth fitting portion is provided on the second female temple fitting portion, a seventh fitting portion is provided on the first male frame fitting portion and an eighth fitting portion is provided on the second male frame fitting portion. The fifth and seventh fitting portions are fittable to each other and the sixth and eighth fitting portions are fittable to each other.

In the eyeglasses according to the present invention, moreover, the front portion of each of the temples is formed of a forked portion with a first portion and a second portion, which is elastically deformable in a vertical direction. The first portion has the male frame fitting portion at its front end and the second portion has the second male frame fitting portion at its front end.

And, in the eyeglasses according to the present invention, the first female temple fitting portion is horizontally provided with a ninth fitting portion, and a front end of the first male frame fitting portion is horizontally provided with a tenth fitting portion to mate with the ninth fitting portion. The ninth and tenth fitting portions are fittable to each other.

Alternatively, in the eyeglasses according to the present invention, the second female temple fitting portion is horizontally provided with an eleventh fitting portion, and a front end of the second male frame fitting portion is horizontally provided with a twelfth fitting portion to mate with the eleventh fitting portion. The eleventh and twelfth fitting portions are fittable to each other.

Furthermore, the eyeglasses according to the present invention may have the ninth fitting portion, the eleventh fitting portion, the tenth fitting portion and the twelfth fitting portion. The ninth and tenth fitting portions are fittable to each other, and the eleventh and twelfth fitting portions are fittable to each other.

With the above structure, in the eyeglasses of the present invention, the volume of the frames is reduced to lighten the eyeglasses as a whole, an effective forward vision of a wearer is guaranteed even when he or she leans forward, and a lens is readily attached to or detached from the frames so as to enable a very easy lens exchange.

DETAILED DESCRIPTION OF THE PREFERRED EMBODIMENTS

Figure 1:
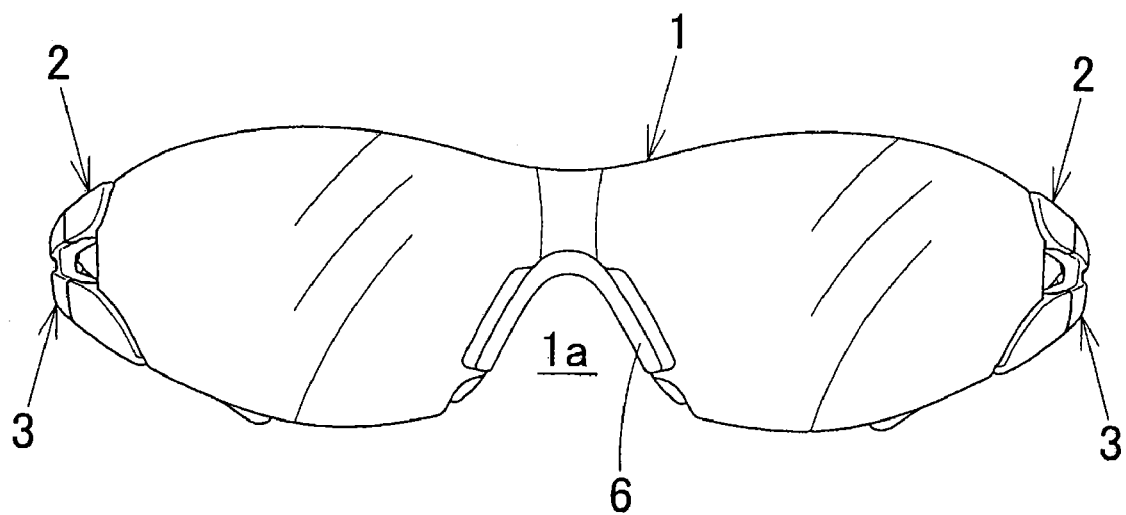
FIG. 1 is a front view of the eyeglasses according to the present invention.

Embodiments of eyeglasses according to the present invention will be described below in detail with reference to the drawings.

A pair of eyeglasses according to the present invention includes a lens 1, a couple of left and right elastically deformable frames 2 attached to side end portions of the lens 1, and a couple of left and right temples 3 attached to the respective frames 2. The lens 1 has a frame fitting portion 4 at each of the side end portions, and each of the frames 2 has a lens fitting hole 5 in a front portion thereof. By fitting the frame fitting portion 4 into the lens fitting hole 5, the front portion of each of the frames 2 is detachably attached to associated side end portion of the lens 1.

Figure 2:
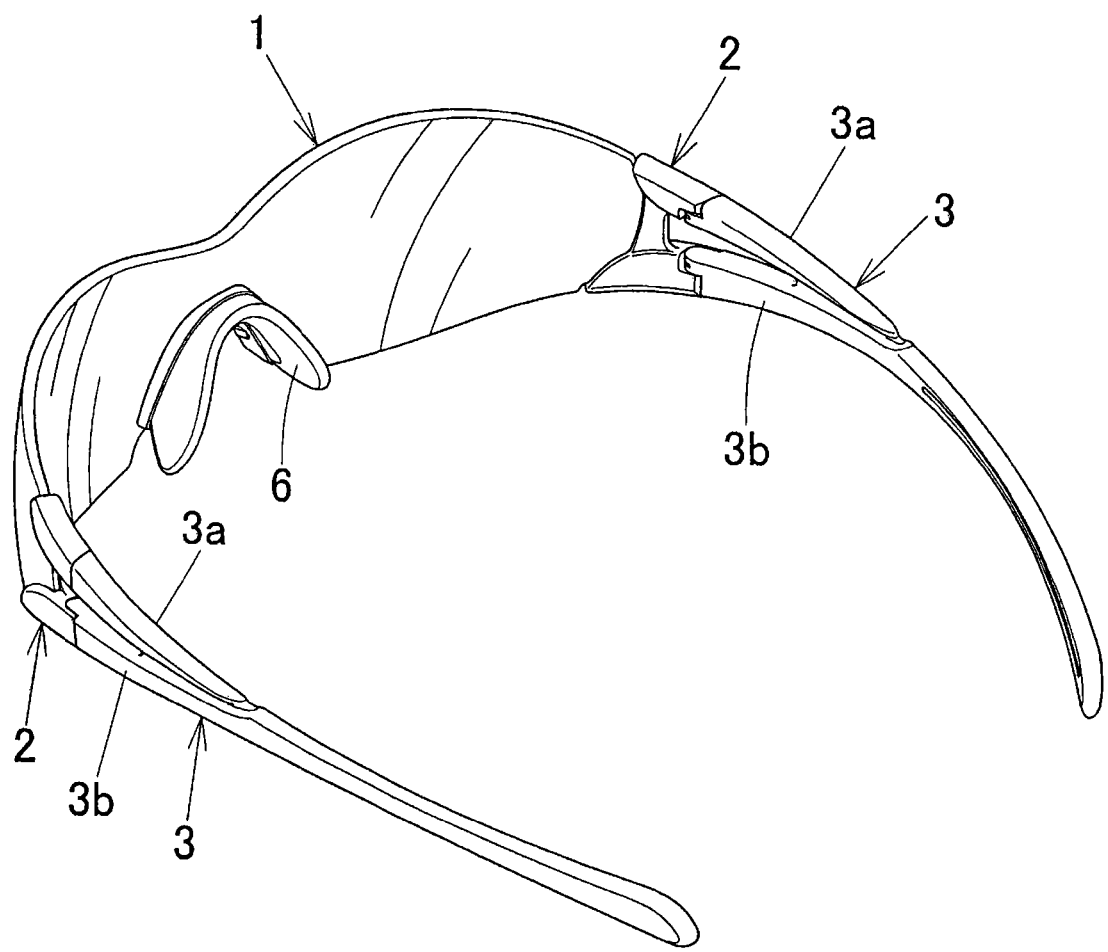
FIG. 2 is a perspective view from the rear side of the eyeglasses according to the present invention.
Figure 3:
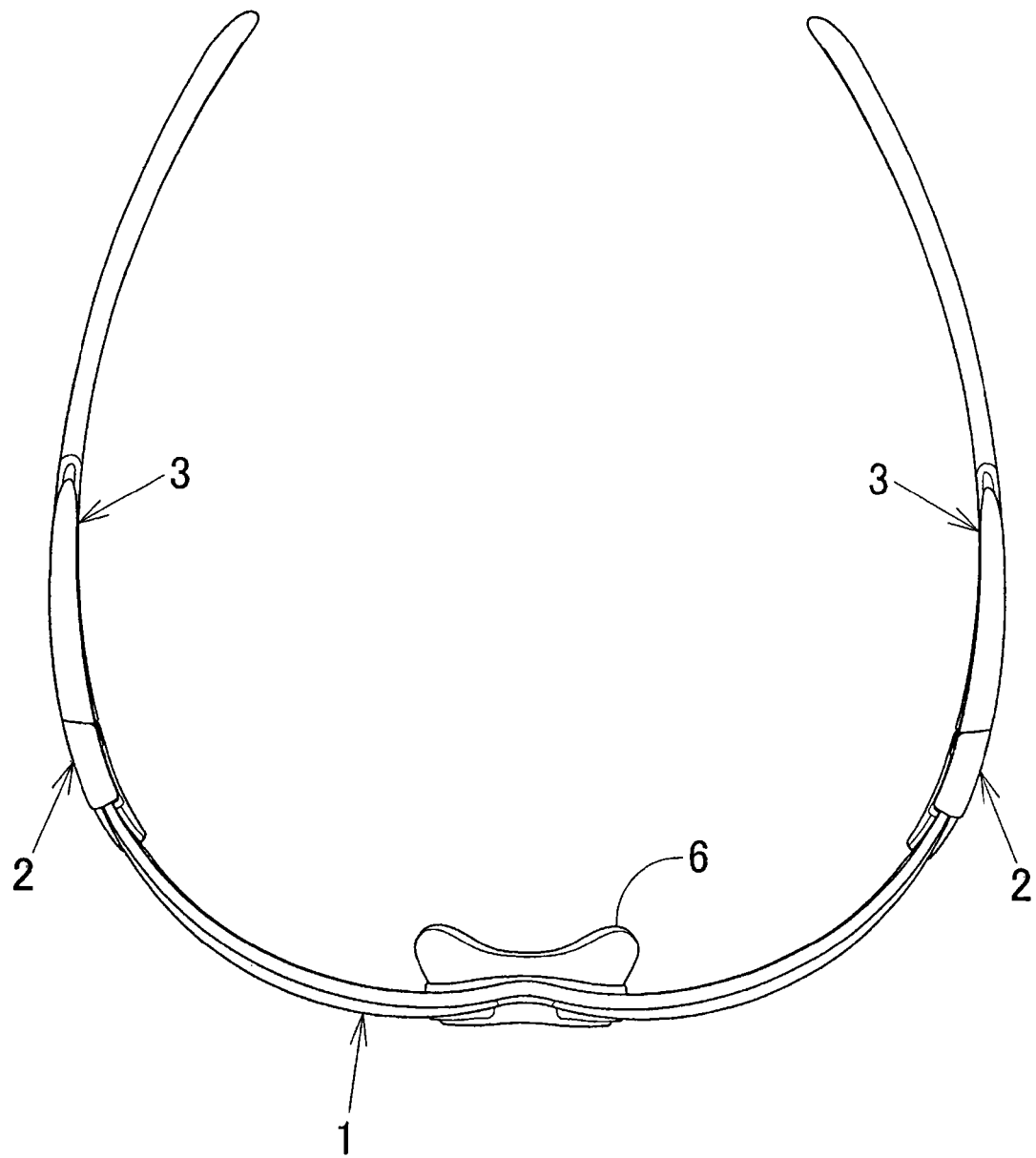
FIG. 3 is a plan view of the eyeglasses with temples unfolded according to the present invention.
Figure 4:
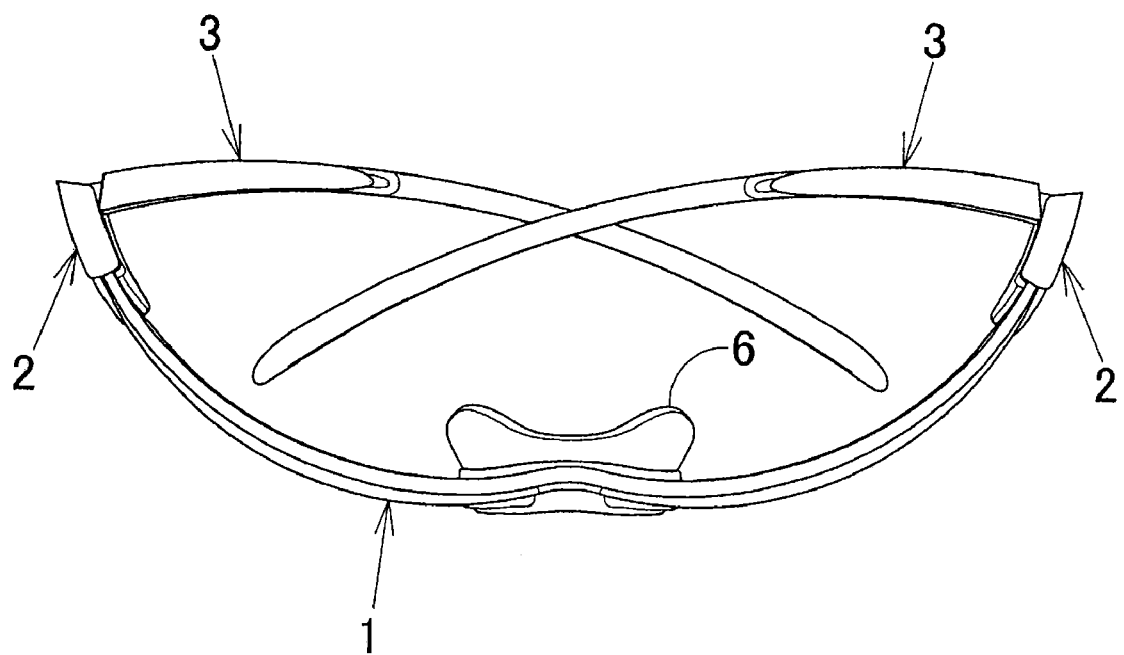
FIG. 4 is a plan view of the eyeglasses with the temples folded according to the present invention.

The lens 1 can be formed of, for example, a single lens or twin lenses made of polycarbonate or any other suitable impact-resistant plastic, or a single lens made of hard glass. As shown in FIGS. 1 and 2, in case the lens 1 is formed of a single lens, a cutout 1a having a substantially V shape is formed at a lower central portion of the lens 1, and a nose pad 6 is removably attached to the cutout portion of the lens 1. In case the lens 1 is formed of twin lenses, a couple of nose pads (not shown) are respectively fixed to at substantially central portions of inner side end portions of the respective twin lenses.

Each of the side end portions of the lens 1 has a fitting portion 4a at an upper portion and a fitting portion 4b at a lower portion, both of which are formed by cutting the lens 1 to form recesses and projections. The fitting portions 4a and 4b respectively detachably fit into associated fitting portion 5a and 5b provided in the lens fitting hole 5 of each of the frames 2, which will be described later. In case the fitting portions 4a and 4b are formed in a female shape, the fitting portions 5a and 5b are set in a male shape, whereas in case the fitting portions 4a and 4b are formed in a male shape, the fitting portions 5a and 5b are set in a female shape. As result, the portions 4a and 4b and the portions 5a and 5b detachably fit right in a male-female manner.

Each of the frames 2 is made of nylon or any other suitable synthetic resin, and elastically deformable as described above.

The lens fitting hole 5 provided at the front portion of each of the frames 2 has a shape defined by an upper wall 2a, a lower wall 2b, an inner wall 2c and an outer wall 2d. An upper surface of the lens fitting hole 5 is provided with the fitting portion 5a by raising or depressing the upper surface, into or from which the fitting portion 4a can fit or detach, while a lower surface of the lens fitting hole 5 is provided with the fitting portion 5b similarly, into or from which the fitting portion 4b can fit or detach. The lens fitting hole 5 has a vertically elongated shape so as to mate with the frame fitting portion 4 which also has a vertically elongated shape, but not limitative thereto, and can have an arbitrary shape according to the shape of the frame fitting portion 4.

Further, as illustrated, cutouts 11 and 12 are formed in front and rear portions of the inner wall 2c of each of the frames 2 to narrow the inner wall 2c. In addition, a cutout 13 laterally crossing the outer wall 2d at the center is formed and separates the outer wall 2d into upper and lower portions. The inner wall 2c, by being narrowed, becomes readily elastically deformable. The inner wall 2c, by being thinned as well as narrowed or thinned but not narrowed, also becomes readily elastically deformable. The cutout 13 can be filled with a flexible member having rubber elasticity. Alternatively, instead of forming the cutout 13, this portion of the wall 2d can be formed with a flexible member having rubber elasticity.

Alternatively, although not illustrated, the inner wall 2c of each of the frames 2 may have a cutout 13 laterally crossing the inner wall 2c at the center to separate it into upper and lower portions, and the outer wall 2d of each of the frames 2 may have cutouts 11 and 12 in front and rear portions of the outer wall 2d to narrow it. In this case, the outer wall 2d, by being narrowed, becomes readily elastically deformable. The outer wall 2d, by being thinned as well as narrowed or thinned but not narrowed, also becomes readily elastically deformable. In this case as well, the cutout 13 can be filled with a flexible member having rubber elasticity. Alternatively, instead of forming the cutout 13, the portion of the wall 2c can be formed with a flexible member having rubber elasticity.

Still alternatively, although not illustrated, both of the inner wall 2c and the outer wall 2d of each of the frames 2 may respectively have a cutout 13 laterally crossing the inner or outer wall 2c and 2d at the center to separate them into upper and lower portions. In this case as well, each of the cutouts 13 can be filled with a flexible member having rubber elasticity. Alternatively, instead of forming the cutouts 13, the portions of the walls 2c and 2d can be formed with a flexible member having rubber elasticity.

The rear portion of each of the frames 2 has a female temple fitting portion 14 in an upper portion and another female temple portion 15 in a lower portion, each of which is formed by recessing an inner side of upper or lower rear end portion. On the other hand, the front portion of each of the temples 3 has male frame fitting portions 16 and 17 which are protruded in the front portions. The front portion of each of the temples 3 is detachably attached to the rear portion of each of the frames 2 in a fashion that the male frame fitting portion 16 fits into the female temple fitting portion 14 and the male frame fitting portion 17 fits into the female temple fitting portion 15 wherein the male frame fitting portions 16 and 17 are respectively detachable from the female temple fitting portions 14 and 15.

The female temple fitting portions 14 and 15 respectively includes fitting portion 14a and 15a which extend vertical. The fitting portion 14a is fittably engaged with a fitting portion 16a provided on the male frame fitting portion 16 of each of the frames 3, while a fitting portion 15a is fittably engaged with a fitting portion 17a provided on the male frame fitting portion 17 of each of the frames 3, which will be described later. In case the fitting portions 14a and 15a are formed in a female shape, the fitting portion 16a and 17a are set in a male shape, while in case the fitting portions 14a and 15a are formed in a male shape, the fitting portion 16a and 17a are set in a male shape. Therefore the fitting portions associating mutually are engageable with each other in a male-female manner.

The female temple fitting portion 14 provided in the upper rear portion of the frame 2 is defined by a front wall 2e, a side wall 2f and an upper wall 2g that are perpendicularly adjacent to each other, and the female temple fitting portion 15 provided in the lower rear portion of the frame 2 is defined by a front wall 2e, a side wall 2f, and a lower wall 2h that are perpendicularly adjacent to each other. The upper wall 2g of the female temple fitting portion 14 is provided with the fitting portion 14a, and the lower wall 2h of the temple fitting female portion 15 is provided with the fitting portion 15a.

The front portion of each of the temples 3 is formed of a forked portion with portions 3a and 3b which is elastically deformable upward and downward. The portion 3a of the forked portion has the male frame fitting portion 16 at its front end, while the portion 3b of the forked portion has the male frame fitting portion 17 at its front end. Furthermore, the male frame fitting portion 16 has the fitting portion 16a vertically on the upper side, while the male frame fitting portion 17 has the fitting portion 16a vertically on the lower side.

Further, the front wall 2e of each of the female temple fitting portions 14 and 15 is curved, and the front end of each of the male frame fitting portions 16 and 17 is similarly curved so as to fit the front wall 2e. The fitting portion 16a of the male frame fitting portion 16 fits into the fitting portion 14a of the female temple fitting portion 14, the fitting portion 17a of the male frame fitting portion 17 fits into the fitting portion 15a of the female temple fitting portion 15, the front end of the male frame fitting portion 16 is slidably in contact with the front wall 2e of the female temple fitting portion 14, and the front end of the male frame fitting portion 17 is slidably in contact with the front wall 2e of the female temple fitting portion 15, thereby each of the temples 3 is horizontally pivotable in a range of approximately 90 degrees with respect to the associated frame 2.

Figure 10:
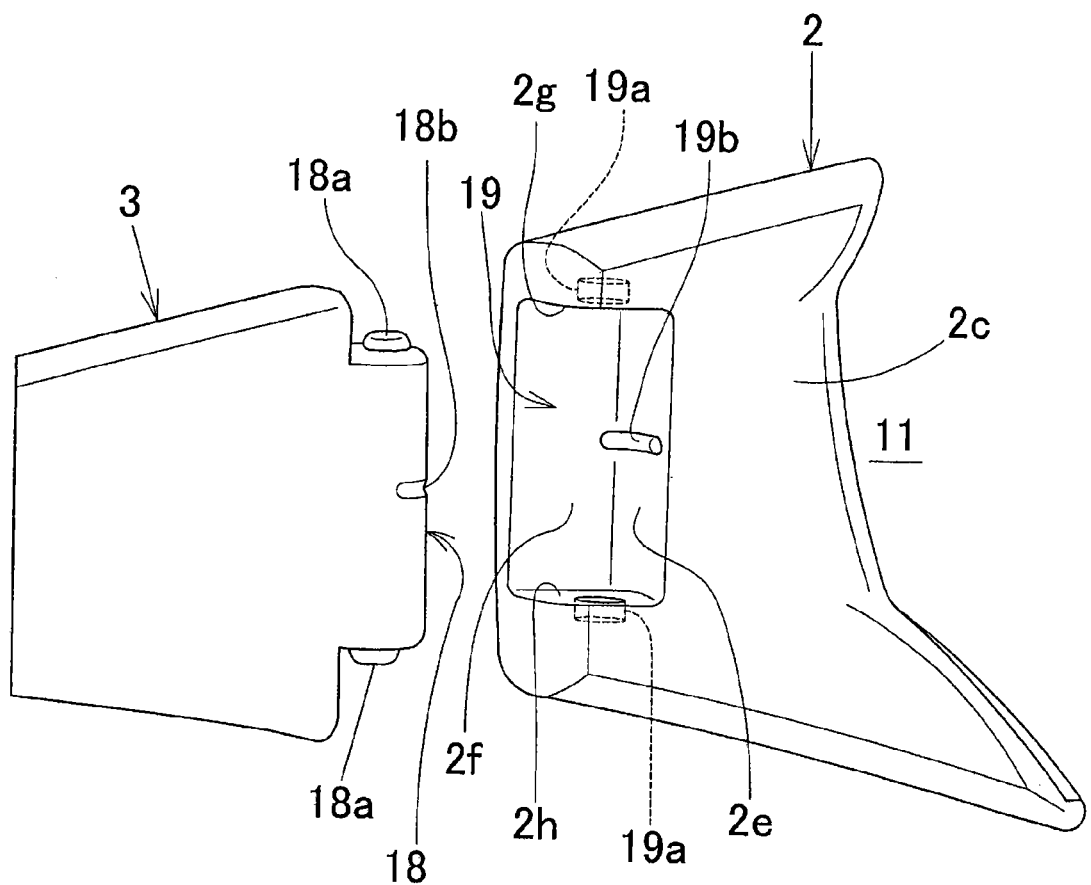
FIG. 10 is a perspective view of another embodiment of eyeglasses according to the present invention, which has no forked portion at a front of each of the temples, showing the state before one temple is attached to a frame or after the former has been removed from the latter.
Figure 11:
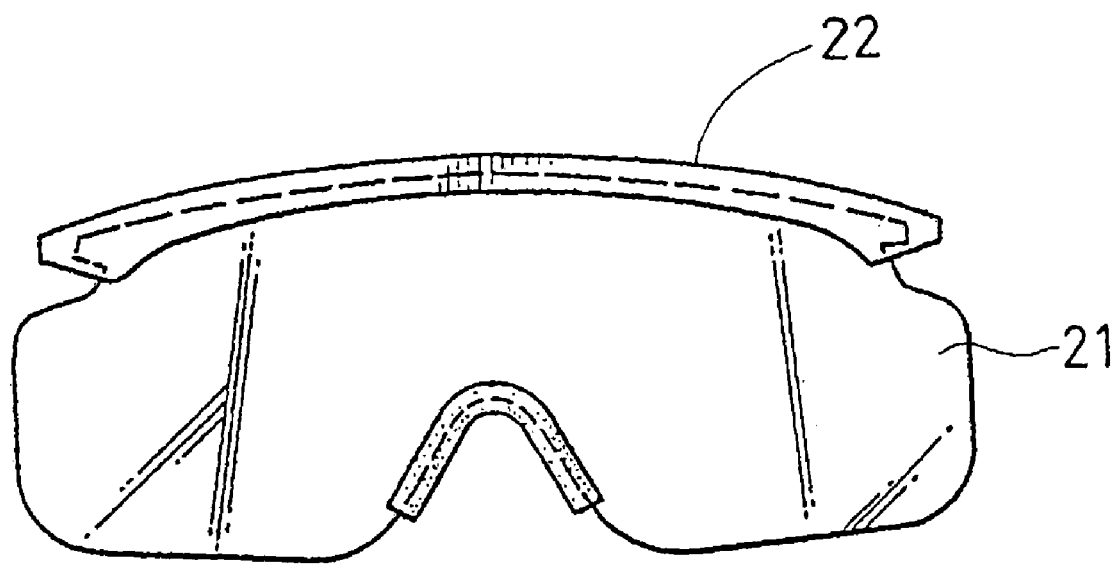
FIG. 11 is a front view showing an example of conventional eyeglasses.
Figure 12:
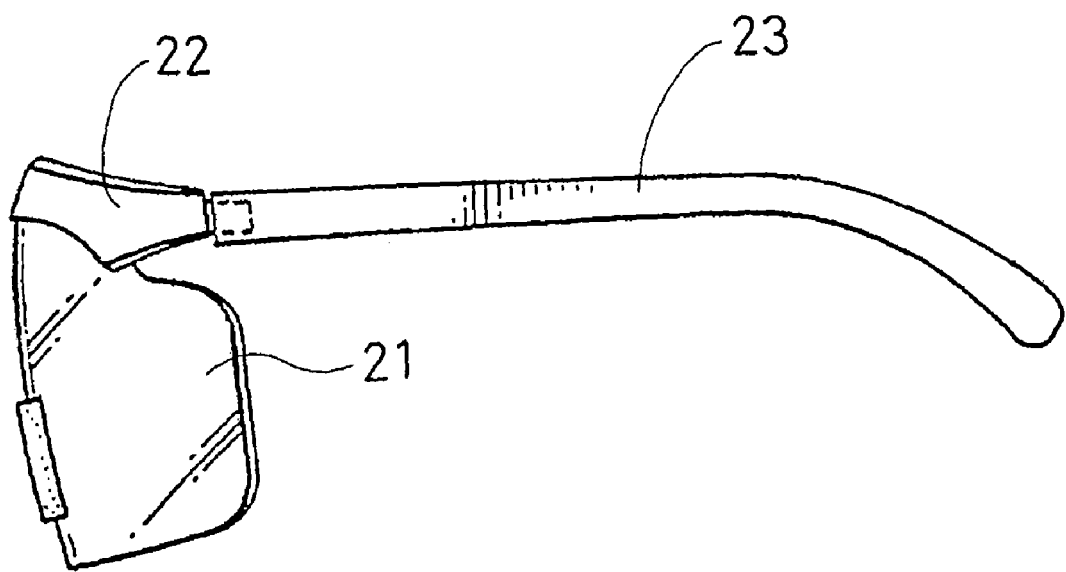
FIG. 12 is a side view of the eyeglasses shown in FIG. 11.
Figure 13:
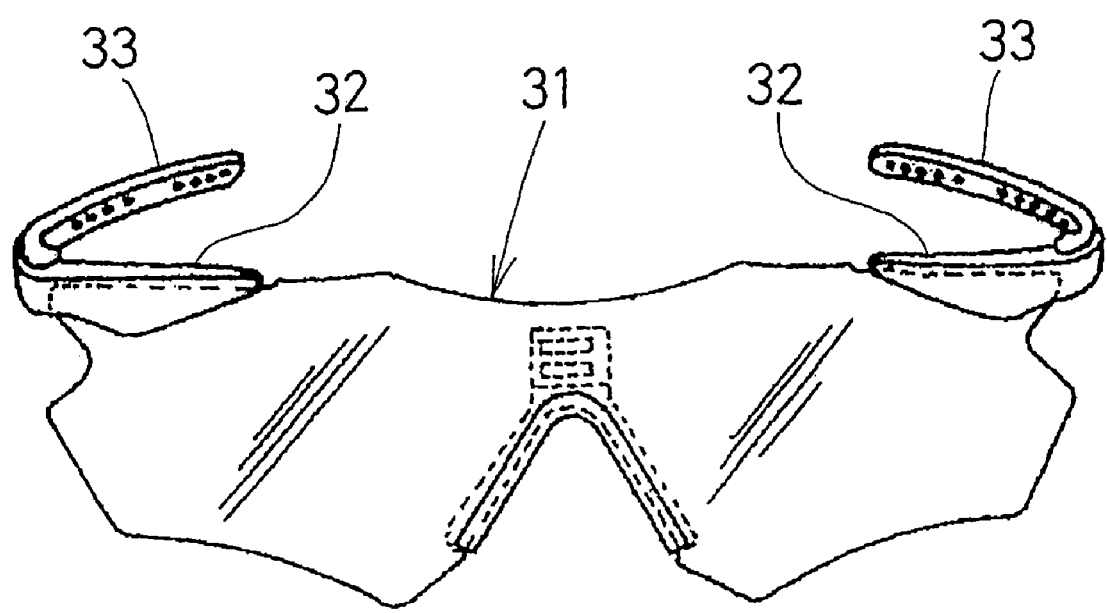
FIG. 13 is a front view showing another example of conventional eyeglasses.
Figure 14:
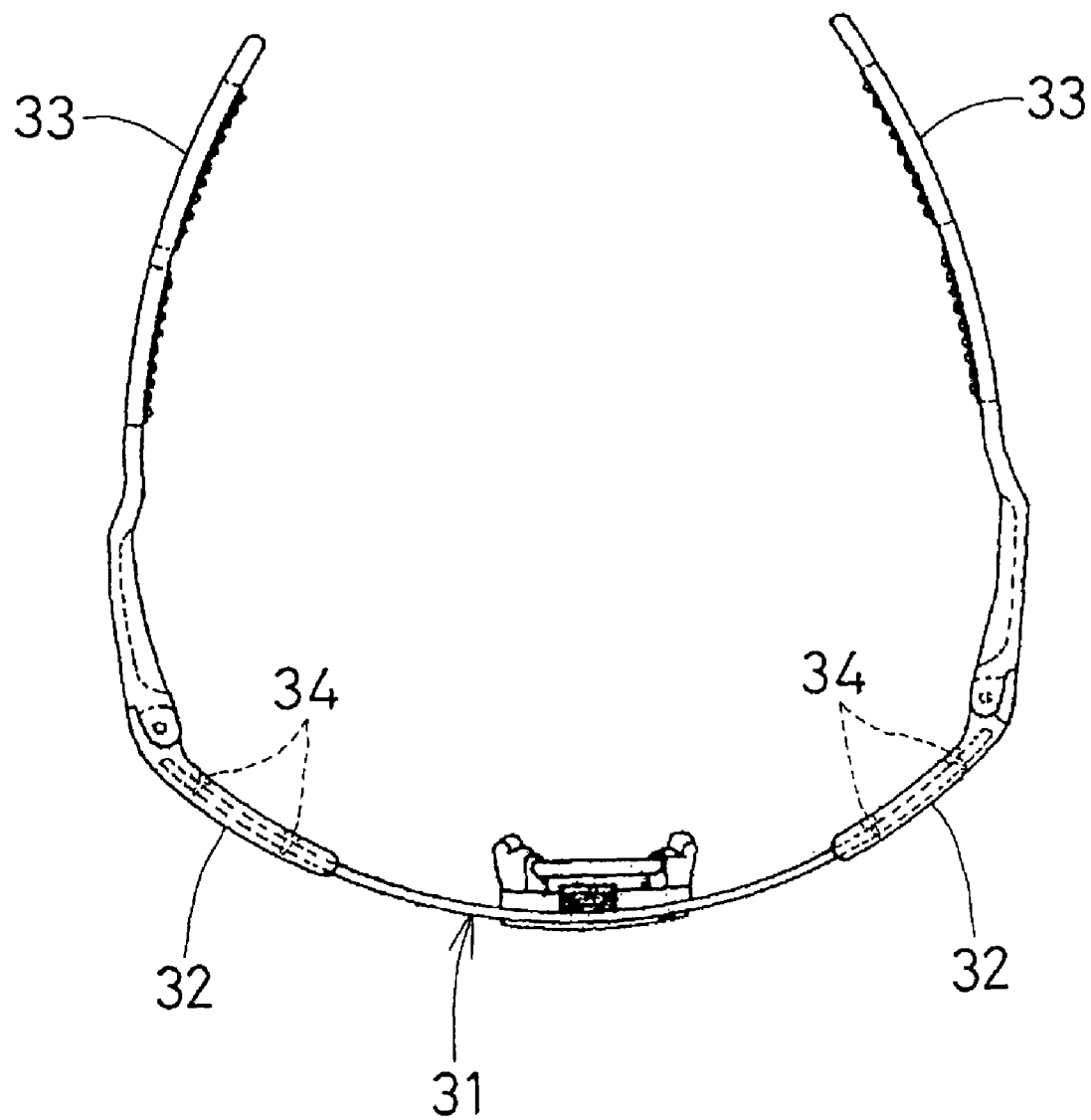
FIG. 14 is a plan view of the eyeglasses shown in FIG. 13.

Further, a fitting portion 14b is horizontally provided on the front wall 2e of the female temple fitting female portion 14, and a fitting portion 15b is horizontally provided on the front wall 2e of the female temple fitting portion 15. A fitting portion 16b to mate with the fitting portion 14b is horizontally provided in the front end of the male frame fitting portion 16, and a fitting portion 17b to mate with the fitting portion 15b is horizontally provided in the front end of the male frame fitting portion 17. The fitting portion 14b detachably fits into the fitting portion 16b, and the fitting portion 15b detachably fits into the fitting portion 17b. Alternatively, although not illustrated, only the front wall 2e of the female temple fitting portion 14 and the front end of the male frame fitting portion 16 may have the fitting portions 14b and 16b horizontally, and thereby the fitting portion 14b may detachably fit into the fitting portion 16b. Still alternatively, although not illustrated, only the front wall 2e of the female temple fitting portion 15 and the front end of the male frame fitting portion 17 may have the fitting portions 15b and 17b horizontally, and the fitting portion 15b may detachably fit into the fitting portion 17b. A still further alternative is shown in FIG. 10, where the front portion of each of the temples 3 has no forked portion with 3a and 3b. The front portion of each of the temples 3 is provided with a male frame fitting portion 18 which corresponds to either of the fitting portions 16b and 17b, and the front end of the fitting portion 18 has a fitting portion 18b which corresponds to either of the fitting portions 16b and 17b. On the other hand, the female temple fitting portions 14 and 15 may be joined to form a female temple fitting portion 19 which has a fitting portion 19b corresponding to either of the fitting portions 14b and 15b on the front wall 2e, and thereby the fitting portions 18b and 19b may fittably engage with each other. In this case, the male frame fitting portion 18 is provided with a fitting portion 18a corresponding to the fitting portion 16a on its upper portion and another fitting portion 18a corresponding to the fitting portion 17a on its lower portion. Further, the female temple fitting portion 19 is defined by the front wall 2e, the side wall 2f, the upper wall 2g and the lower wall 2h that are perpendicularly adjacent to each other. The upper wall 2g of the female temple fitting portion 19 is provided with a fitting portion 19a corresponding to the fitting portion 14a, while the lower wall 2h of the female temple fitting portion 19 is provided with another fitting portion 19a corresponding to the fitting portion 15a. In case the fitting portion 14b, 15b and 19b are formed in a male shape, the fitting portions 16b, 17b and 18b are set in a female shape, whereas in case the fitting portions 14b, 15b, and 19b are formed in a female shape, the fitting portions 16b, 17b, and 18b are set in a male shape. Therefore the fitting portions associating mutually are engageably in a male-female manner.

Each of the temples 3 horizontally pivots with respect to the associated frame 2 in a manner wherein the fitting portion 14b on the front wall 2e of the female temple fitting portion 14 fits into the fitting portion 16b on the front end of the male fitting portion 16 and is slidably in contact with the fitting portion 16b, the fitting portion 15b on the front wall 2e of the female temple fitting portion 15 fits into the fitting portion 17b on the front end of the male frame fitting portion 17 and is slidably in contact with the fitting portion 17b, and thereby the temple 3 does not wobble with respect to the frame 2. When each of the temples 3 has horizontally pivoted with respect to the associated frame 2 by approximately 90 degrees, the engagements between the fitting portions 14b and 16b and between the fitting portions 15b and 17b are released. This configuration is advantageous in removing the temple 3 from the associated frame 2, which will be described in detail later. Briefly, pivoting the temple 3 by approximately 90 degrees before removal will eliminate the resistance between the fitting portions 14b and 16b as well as the resistance between the fitting portions 15b and 17b and thus facilitate easy release between the temple 3 and the frame 2.

Figure 5A:
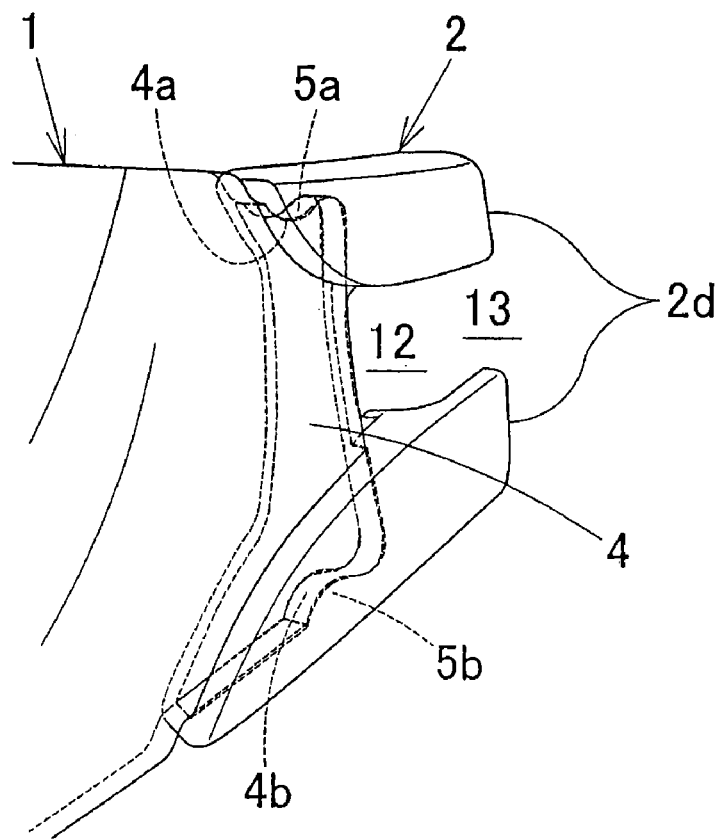
FIG. 5A is a perspective view of the eyeglasses according to the present invention showing the state after a frame has been attached to a lens or before the frame is removed from the lens.
Figure 5B:
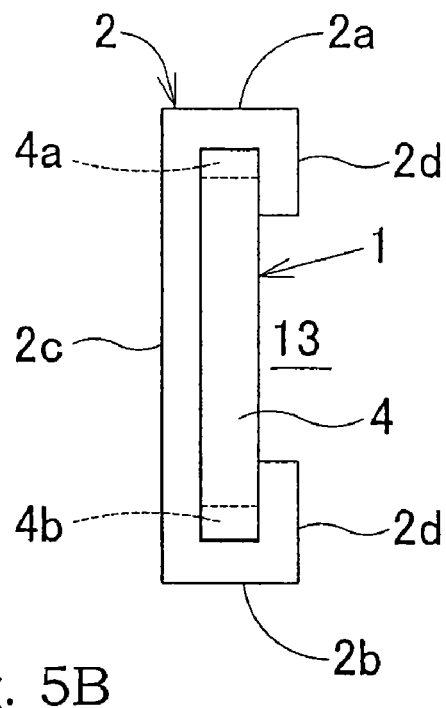
FIG. 5B is an end view showing the state in FIG. 5A.
Figure 6A:
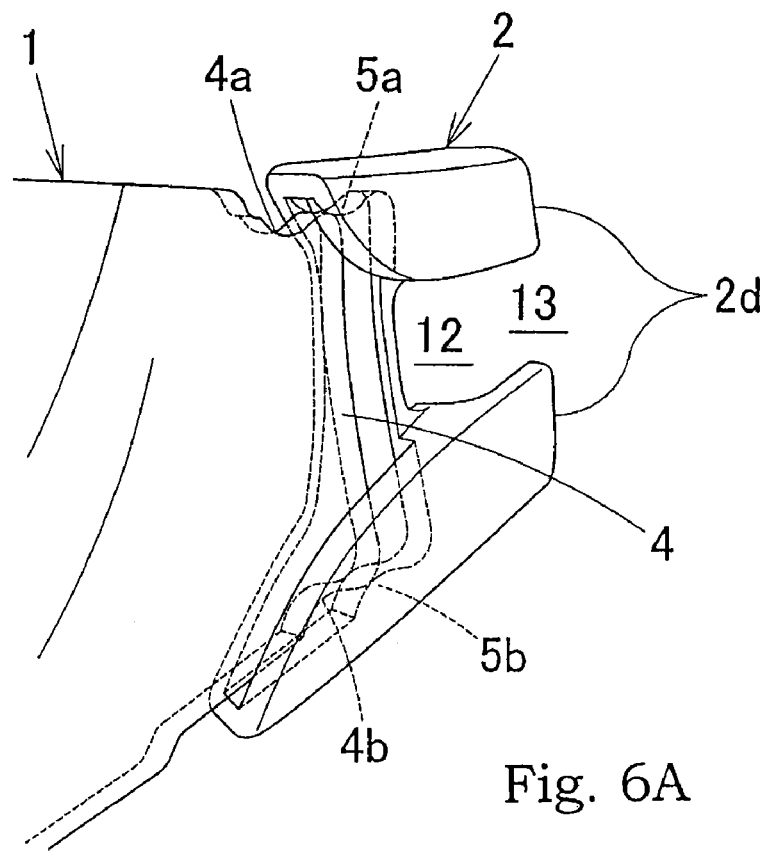
FIG. 6A is a perspective view of the eyeglasses according to the present invention showing the state when the frame is being attached to the lens or when the frame is being removed from the lens.
Figure 6B:
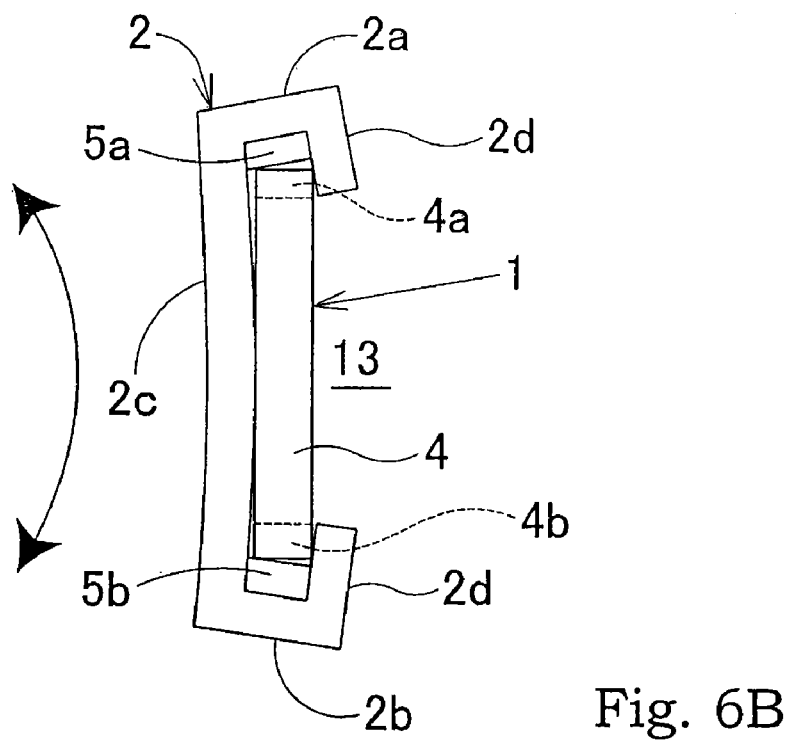
FIG. 6B is an end view showing the state in FIG. 6A.
Figure 7A:
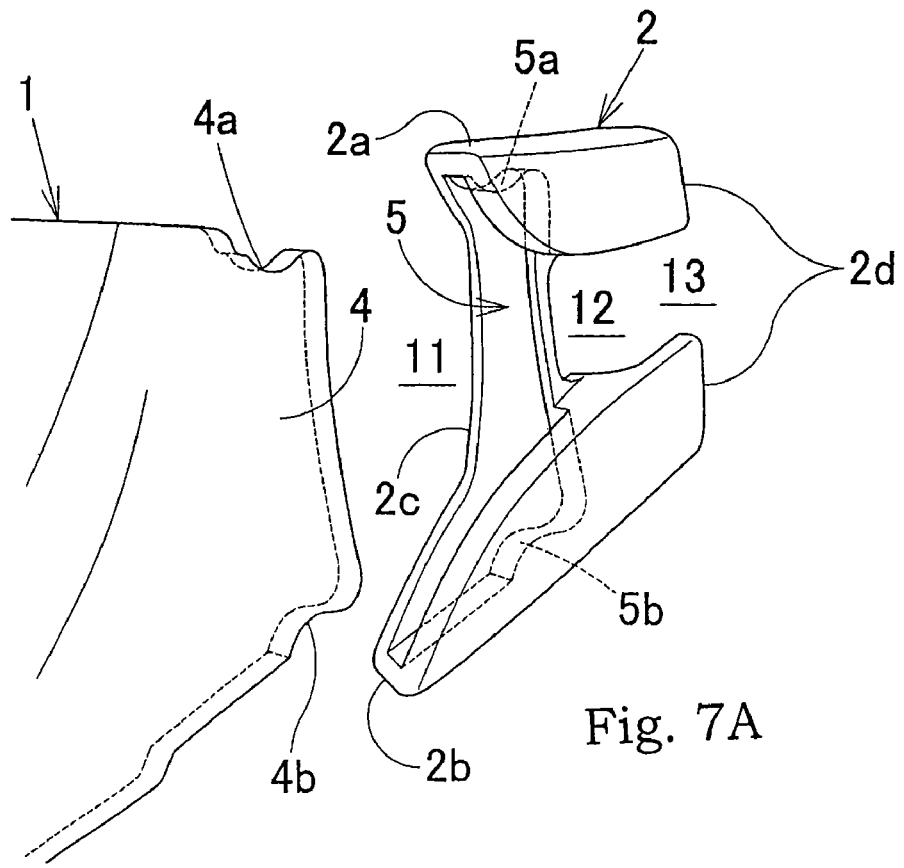
FIG. 7A is a perspective view of the eyeglasses according to the present invention showing the state before the frame is attached to the lens or after the frame has been removed from the lens.
Figure 7B:
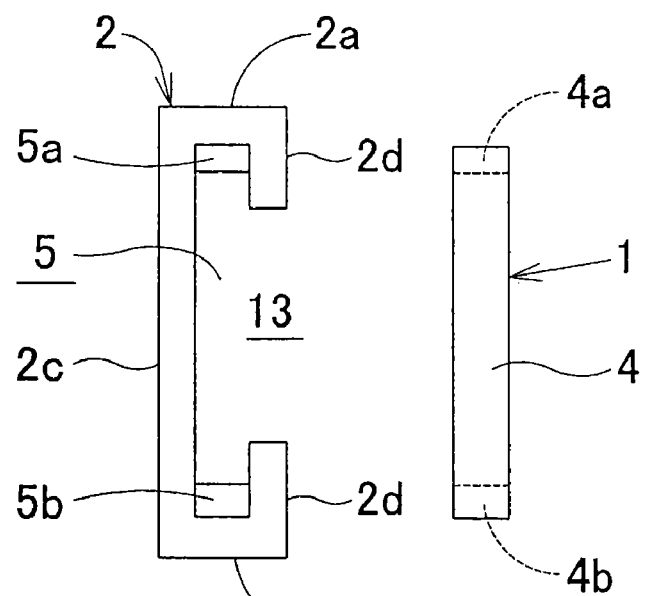
FIG. 7B is an end view showing the state in FIG. 7A.

With the structure as stated above, in the eyeglasses according to the present invention, a couple of left and right frames 2 are detachably attached respectively to the right and left side end portions of the lens 1 so that the volume as well as the weight of the frames 2 can be reduced, which consequently reduces the weight of the eyeglasses. At the same time, the left and right frames 2 will not narrow the forward vision of a wearer, but guarantee the effective forward vision when he or she leans forward In the eyeglasses of the present invention, the lens 1 is removed from each of the frames 2 in the following manner: The eyeglasses being in the state shown in FIGS. 5A and 5B, a user pinches the inner and outer walls 2c and 2d of one of the frames 2 with a thumb and a finger or fingers of one hand, and the lens 1 with those of the other hand, and then pulls the lens 1 in the removal direction from the frame 2. Here, the inner wall 2c of the frame 2 elastically deforms as shown in FIG. 6B and the gap between the fitting portions 5a and 5b of the frame 2 increases. This facilitates easy removal of the fitting portion 4a of the lens 1 being in the fitting portion 5a and the fitting portion 4b of the lens 1 being in the fitting portion 5b. And then the lens 1 can be removed from the frame as shown in FIGS. 7A and 7B.

On the other hand, in the eyeglasses of the present invention, the lens 1 can be attached to each of the frames 2 in the following manner: The eyeglasses being in the state shown in FIGS. 7A and 7B, the user pinches the inner and outer walls 2c and 2d of the frame 2 with a thumb and a finger or fingers of one hand, and the lens 1 with those of the other hand, and pushes the frame fitting portion 4 of the lens 1 toward into the lens fitting hole 5 of the frame 2. As a result, the fitting portion 4a of the lens 1 presses against the fitting portion 5a of the frame 2, and the fitting portion 4b of the lens 1 presses against the fitting portion 5b of the frame 2, whereby the inner wall 2c of the frame 2 elastically deforms as shown in FIG. 6B. Here the gap between the fitting portions 5a and 5b of the frame 2 increases, and this facilitates the fitting portions 4a and 4b of the lens 1 to fit into the fitting portions 5a and 5b respectively. Thus the lens 1 can be readily attached to the frame 2 as shown in FIGS. 5A and 5B.

Further, in the eyeglasses of the present invention, when the lens 1 is removed from or attached to the frames 2, the friction resistance between the fitting portions 4a and 5a and between the fitting portions 4b and 5b is reduced. As a result, these portions will be prevented from wearing out and unwanted deforming, and hence the durability is improved.

Further, in the eyeglasses of the present invention, the degree of elastic deformation of the inner wall 2c of the frame 2 can be controlled by adjusting the width and/or the thickness of the inner wall 2c of the frame 2. The width and/or the thickness thereof may be set at a size appropriate for removal and/or attachment of the lens 1 and the frames 2 in accordance with the application of the eyeglasses.

Figure 8:
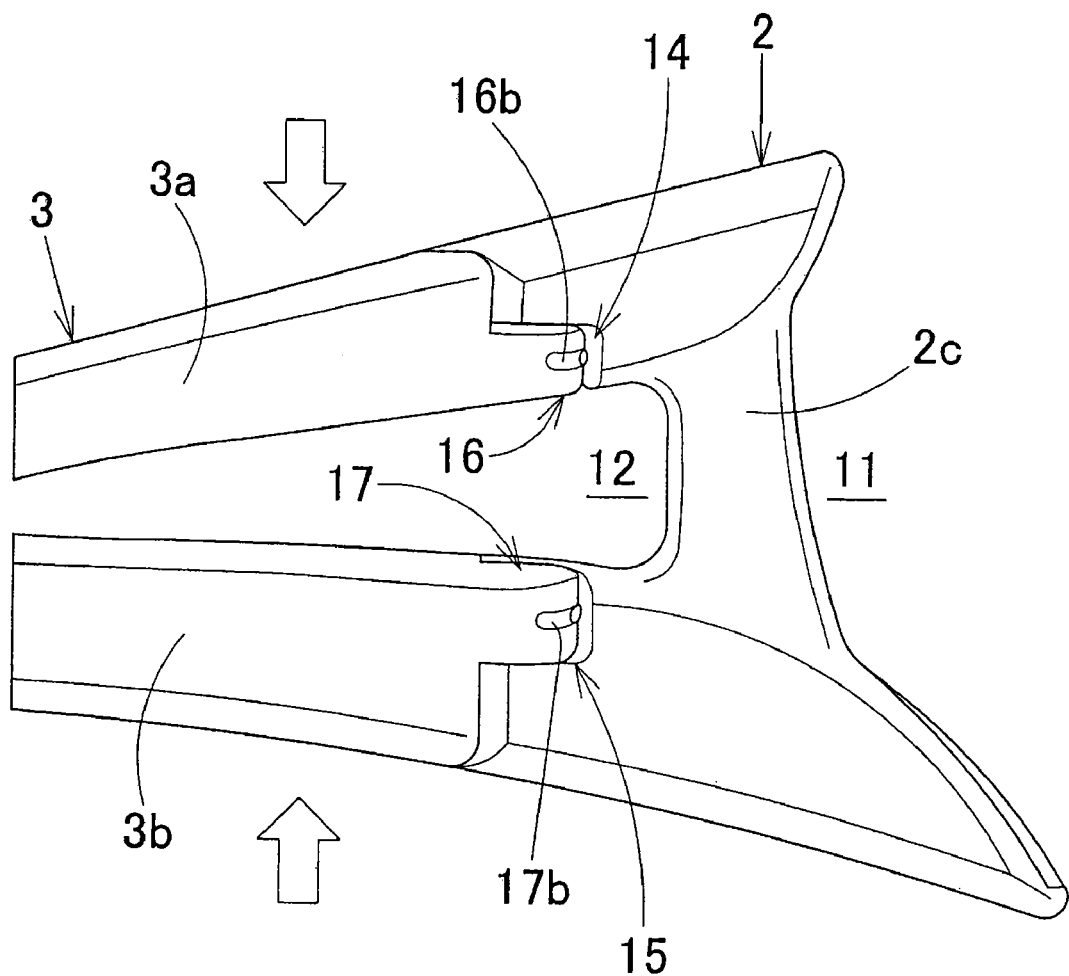
FIG. 8 is a perspective view of the eyeglasses according to the present invention showing the state after a temple has been attached to a frame or before the former is removed from the latter.
Figure 9:
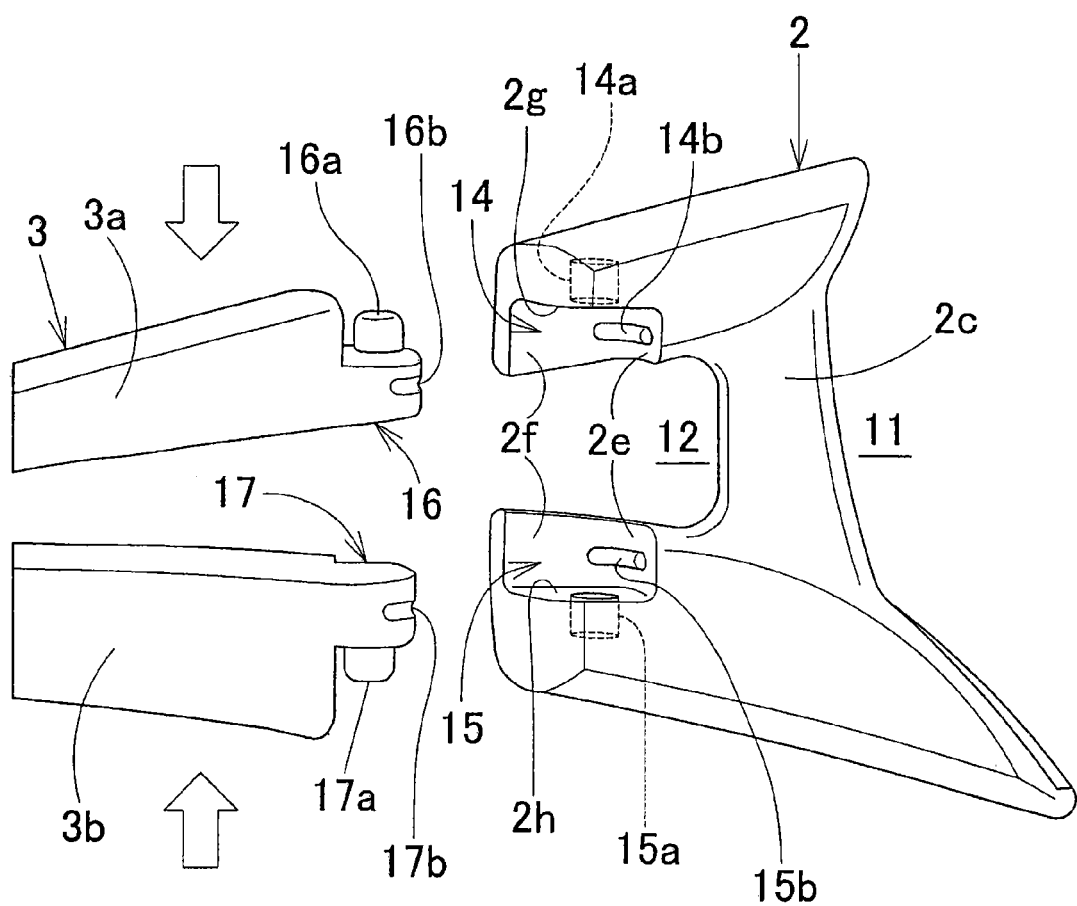
FIG. 9 is a perspective view of the eyeglasses according to the present invention showing the state before a temple is attached to a frame or after the former has been removed from the latter.

Next, in the eyeglasses of the present invention, each of the temples 3 is removed from the associated frame 2 in the following manner: The frame 2 and the temple 3 being in the state shown in FIG. 8, a user pinches the frame 2 with a thumb and a finger or fingers of one hand, and pinches and presses the portions 3a and 3b of the forked portion of the temple 3 from above and below with a thumb and a finger or fingers of the other hand. The gap between the portions 3a and 3b decreases, and this releases the fitting portion 16a of the male frame fitting portion 16 from the fitting portion 14a of the female temple fitting portion 14 and the fitting portion 17a of the male frame fitting portion 17 from the fitting portion 15a of the female temple fitting portion 15. In this state, the temple 3 is pulled apart from the frame 2, and it can be readily removed therefrom as shown in FIG. 9.

On the other hand, in the eyeglasses of the present invention, each of the temples 3 is attached to the associated frame 2 in the following manner: The frame 2 and the temple 3 being in the state shown in FIG. 9, a user pinches the frame 2 with a thumb and a finger or fingers of one hand, and pinches and presses the portions 3a and 3b of the forked portion of the temple 3 from above and below with a thumb and a finger or fingers of the other hand. Then the gap between the portions 3a and 3b decreases. In this state, the fitting portion 16a of the male frame fitting portion 16 is positioned to align with the fitting portion 14a of the female temple fitting portion 14, and the fitting portion 17a of the male frame fitting portion 17 is positioned to align with the fitting portion 15a of the female temple fitting portion 15. Keeping this state, the user ceases pressing to let the portions 3a and 3b of the forked portion restore to the original state with a widened gap, and thereby the fitting portion 16a fits into the fitting portion 14a and the fitting portion 17a fits into the fitting portion 15a. Moreover, the fitting portion 14b on the front wall 2e of the female temple fitting portion 14 fits into the fitting portion 16b in the front end portion of the male frame fitting portion 16, and the fitting portion 15b on the front wall 2e of the female temple fitting portion 15 fits into the fitting portion 17b in the front end of the male frame fitting portion 17, whereby each of temples 3 can be readily attached to the associated frame 2, as shown in FIG. 8.

Furthermore, in the eyeglasses of the present invention, each of the temples 3 attached to the associated frame 2 can horizontally pivot but will not wobble with respect to the frame 2, as described above. Further, the portions where the fitting portions 16a and 17a respectively fit into the fitting portions 14a and 15a and the portions where the fitting portions 14b and 15b respectively fit into the fitting portions 16b and 17b are not exposed outside and thereby will unlikely be affected by any surface treatment, such as painting. As a result, condition of an appropriate fitting engagement can be maintained.

What is claimed is:

1. Eyeglasses comprising:
    a lens;
    a couple of right and left elastically deformable frames attached to respective side end portions of the lens;
    a couple of right and left temples attached to respective frames;
    a frame fitting portion provided at each of the side end portions of the lens;
    a lens fitting hole provided in a front portion of each of the frames;
    wherein the frame fitting portion fits into the lens fitting hole so that the lens is detachably attached to each of the frames; and
    further comprising a first fitting portion provided at an upper portion of the frame fitting portion;
    a second fitting portion provided at a lower portion of the frame fitting portion;
    a third fitting portion provided on an upper face of the lens fitting hole;
    a fourth fitting portion provided on a lower face of the lens fitting hole;

wherein the first and third fitting portions are fittable to each other and the second fourth fitting portions are fittable to each other;
the lens fitting hole is defined by an upper wall, a lower wall, an inner wall and an outer wall; and
a cutout laterally crossing a center and extending a full length of at one of the inner wall and the outer wall is provided to separate at least one of the inner wall and the outer wall into an upper portion and a lower portion.

2. The eyeglasses according to claim 1, wherein a rear portion of each of the frames has a first female temple fitting portion at an upper end and a second female temple fitting portion at a lower end, a front portion of each of the temples has first and second male frame fitting portions, the first male frame fitting portion is fittable into and detachable from the first female fitting portion, the second male frame fitting portion is fittable into and detachable from the second female fitting portion, so that each of the temples is detachably attached to each of the frames.

3. The eyeglasses according to claim 2, wherein a fifth fitting portion is provided on the first female temple fitting portion, a sixth fitting portion is provided on the second female temple fitting portion, a seventh fitting portion is provided on the first male frame fitting portion, an eighth fitting portion is provided on the second male frame fitting portion, the fifth and seventh fitting portions are fittable to each other and the sixth and eighth fitting portions are fittable to each other.

4. The eyeglasses according to claim 3, wherein the front portion of each of the temples is formed of a forked portion with a first portion and a second portion, the first portion has the first male frame fitting portion at a front end and the second portion has the second male frame fitting portion at a front end.

5. The eyeglasses according to claim 3, wherein the first female temple fitting portion is horizontally provided with a ninth fitting portion, a front end of the first male frame fitting portion is horizontally provided with a tenth fitting portion to mate with the ninth fitting portion, and the ninth and tenth fitting portions are fittable to each other.

6. The eyeglasses according to claim 3, wherein the second female temple fitting portion is horizontally provided with an eleventh fitting portion, a front end of the second male frame fitting portion is horizontally provided with a twelfth fitting portion to mate with the eleventh fitting portion, and the eleventh and twelfth fitting portions are fittable to each other.

7. The eyeglasses according to claim 3, wherein the first female temple fitting portion is horizontally provided with a ninth fitting portion, the second female temple fitting portion is horizontally provided with an eleventh fitting portion, a front end of the first male frame fitting portion is horizontally provided with a tenth fitting portion to mate with the ninth fitting portion, a front end of the second male frame fitting portion is horizontally provided with a twelfth fitting portion to mate with the eleventh fitting portion, the ninth and tenth fitting portions are fittable to each other, and the eleventh and twelfth fitting portions are fittable to each other.

8. The eyeglasses according to claim 2, wherein the front portion of each of the temples is formed of a forked portion with a first portion and a second portion, the first portion has the first male frame fitting portion at a front end and the second portion has the second male frame fitting portion at a front end.

9. Eyeglasses comprising:
a lens;
a couple of right and left elastically deformable frames attached to respective side end portions of the lens;
a couple of right and left temples attached to the respective frames;
a frame fitting portion provided at each of the side end portions of the lens;
a lens fitting hole provided in a front portion of each of the frames;
wherein the frame fitting portion fits into the lens fitting hole so that the lens is detachably attached to each of the frames;
a rear portion of each of the frames has a first female temple fitting portion at an upper end and a second female temple fitting portion at a lower end, a front portion of each of the temples has first and second male frame fitting portions, the first male frame fitting portion is fittable into, pivotable with respect to, and detachable from the first female fitting portion, the second male frame fitting portion is fittable into, pivotable with respect to, and detachable from the second female fitting portion so that each of the temples is detachably pivotably attached to each of the frames;
at least one of the first female temple fitting portion and the second female temple fitting portion of each frame is horizontally provided with another fitting portion, a front end of a corresponding male frame fitting portion of the temple is horizontally provided with a further fitting portion that mates with the another fitting portion, and the another and further fitting portions when engaged to each other prevent temple wobble.

10. The eyeglasses of claim 9, wherein engagement of the another fitting portion with the further fitting portion is released when the temple is horizontally pivoted with respect to the corresponding frame by substantially 90 degrees.

* * * * *

UNITED STATES PATENT AND TRADEMARK OFFICE
CERTIFICATE OF CORRECTION

PATENT NO.        : 8,292,425 B2                                    Page 1 of 1
APPLICATION NO.   : 12/548669
DATED             : October 23, 2012
INVENTOR(S)       : Katsuya Takeshi It is certified that error appears in the above-identified patent and that said Letters Patent is hereby corrected as shown below:

Column 9, Line 2: Claim 1, Delete "the second fourth" and insert -- the second and fourth --

Signed and Sealed this
Twenty-second Day of January, 2013

David J. Kappos
*Director of the United States Patent and Trademark Office*